United States Patent [19]

Bergmeier

[11] Patent Number: 5,063,071

[45] Date of Patent: Nov. 5, 1991

[54] METHOD FOR CENTERING AN EGG YOLK DURING COOKING

[75] Inventor: Gerd Bergmeier, Hiddenhausen, Fed. Rep. of Germany

[73] Assignee: Erich Bergmeier Maschinenfabrik, Fed. Rep. of Germany

[21] Appl. No.: 570,773

[22] Filed: Aug. 22, 1990

[30] Foreign Application Priority Data

Aug. 26, 1989 [DE] Fed. Rep. of Germany ....... 3928346

[51] Int. Cl.$^5$ .............................................. A47J 29/00
[52] U.S. Cl. ...................................... 426/298; 99/440; 426/523
[58] Field of Search .................. 426/298, 523; 99/440

[56] References Cited

U.S. PATENT DOCUMENTS 4,276,820  7/1981  Joannore ................................ 99/440

Primary Examiner—George Yeung
Attorney, Agent, or Firm—Laubscher, Presta & Laubscher

[57] ABSTRACT

A method for centering an egg yolk during cooking of the egg is characterized by continuously rotating the egg in opposite directions about the longitudinal axis of the egg while the egg white solidifies. The egg is rotated in opposite directions for equal, relatively short intervals of time and at a relatively high speed. The rotation of the egg and gradual hardening of the egg white causes the egg yolk to migrate toward the enter of the egg resulting in a uniform layer of hardened egg white around the yolk of the cooked egg.

5 Claims, 1 Drawing Sheet

METHOD FOR CENTERING AN EGG YOLK DURING COOKING

The present invention relates to a method for centering an egg yolk during cooking of the egg.

BACKGROUND OF THE INVENTION

When an egg is stored in its raw state, the yolk of the egg rises within the interior of the egg. Thus, there is only a thin layer of egg white between the yolk and the egg shell. In extreme cases, the egg yolk completely displaces the egg white and abuts against the egg shell. If an egg is cooked with the yolk in this position and subsequently peeled, the relatively thin or non-existent layer of egg white is very often damaged, especially when eggs are peeled by machine. Often times, the egg yolk falls out of the cooked egg, whereby the egg is unusable. Losses resulting from damaged egg whites and lost yolks are very high when eggs are processed commercially.

A number of attempts have been made to center the yolk of the egg, i.e. to bring the egg yolk into a position where it is enclosed on all sides by a thick layer of egg white. Centering results when the egg yolk lies concentrically relative to the longitudinal axis of the egg and is spaced from the ends of the egg along the longitudinal axis so that the thickness of the layer of egg white between the end of the egg lying closest to the yolk corresponds roughly to the thickness of the egg white layer enclosing the egg yolk.

Eggs are normally stored with their longitudinal axes running vertically with the pointed end of the egg directed downwardly. Consequently, when an egg is stored for a long period of time, the egg yolk travels upwardly in the direction of the longitudinal axis toward the rounded end of the egg.

BRIEF DESCRIPTION OF THE PRIOR ART

One prior method which has been used in an attempt to induce centering of an egg yolk is to rotate the egg prior to cooking by 180° with respect to its original storage position in anticipation that in the new storage position, the egg yolk will return from its undesired outer position adjacent the rounded end of the egg toward the center thereof.

Aside from the fact that there are hardly any guarantees associated with this prior method, it is also quite inconvenient. When eggs are cooked commercially, comparatively large quantities of eggs are processed per unit time. It is not uncommon for high capacity egg cooking machines to cook between 10,000 to 20,000 eggs per hour. Thus, it is naturally quite time consuming and labor intensive to flip the eggs upside down from their original storage position prior to cooking in an attempt to center the yolk.

Another prior method which has been used in an attempt to center an egg yolk is to rotate the eggs unidirectionally during the cooking process. This method has proven not to be very effective, in particular because it does not cause the egg yolk to travel in the direction of the longitudinal axis. The yolk hardly changes position with respect to the longitudinal axis of the egg. At best, when an egg rotates unidirectionally during cooking, the yolk centers itself radially to the longitudinal axis of the egg but not along the longitudinal axis between the ends of the egg.

The present invention was developed in order to provide a novel method for centering the yolk of an egg during the cooking process, and particularly to move the egg yolk in the direction of the longitudinal axis of the egg to center the yolk longitudinally.

SUMMARY OF THE INVENTION

Accordingly, it is a primary object of the present invention to provide a method for centering an egg yolk during cooking wherein the egg is rotated in a first direction about its longitudinal axis for a first interval time, and then rotated in a second direction about its longitudinal axis opposite the first direction for a second interval of time. Continued rotation of the egg in opposite directions at short intervals of time during the cooking process results in the desired centering of the egg yolk.

According to a more particular object of the invention, the longitudinal axis of the egg is maintained in a generally horizontal plane during rotation of the egg in the first and second directions.

It is yet another object of the invention to rotate the egg in opposite directions for relatively short intervals of time with respect to the solidification time of the egg white. Preferably, the intervals of time of rotation of the egg in the opposite directions are equal, and the egg is rotated at a relatively high speed.

BRIEF DESCRIPTION OF THE FIGURE

Other objects and advantages of the invention will become apparent from a study of the following specification in which.

DETAILED DESCRIPTION

Figure 1:
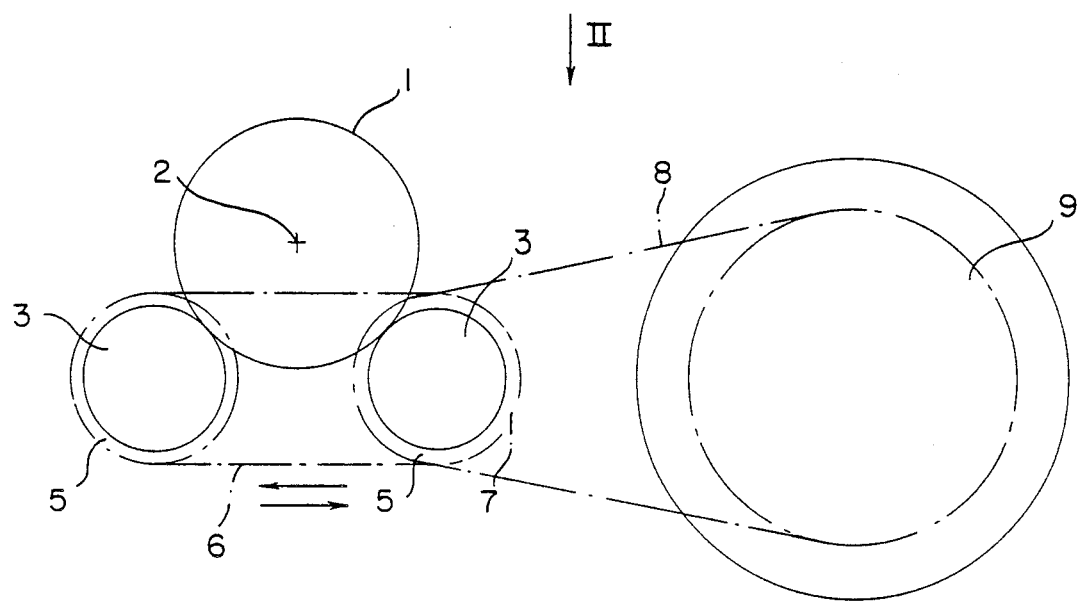
FIG. 1 is a schematic side view of an apparatus for turning an egg at intervals in the opposite direction during the cooking process.
Figure 2:
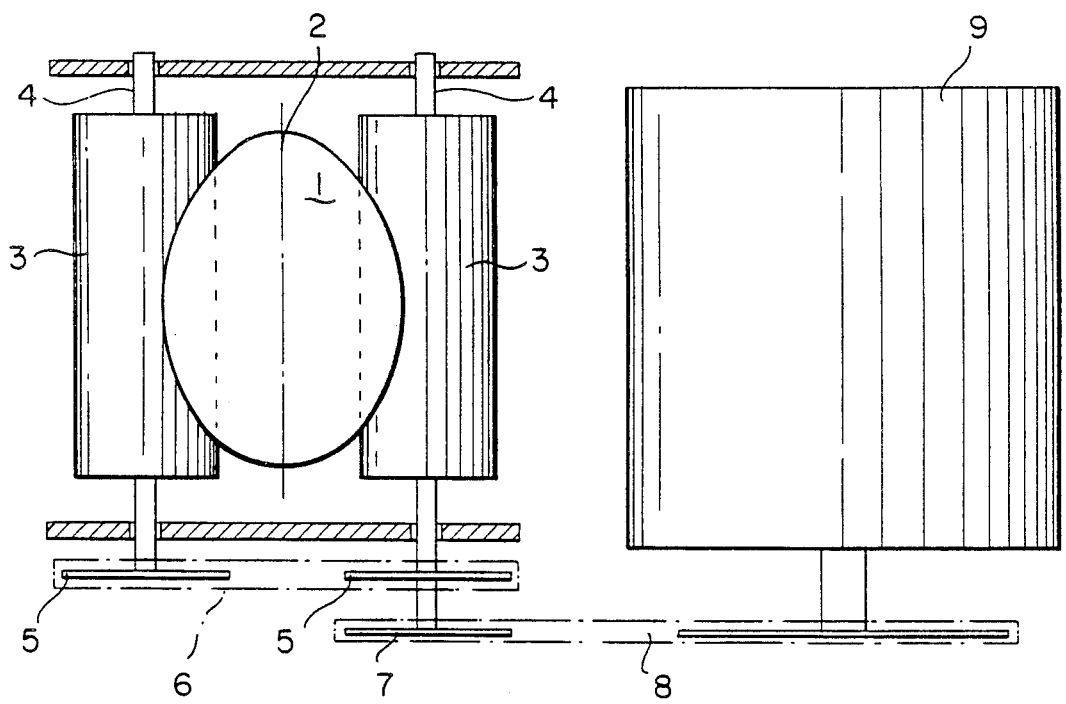
FIG. 2 is a view in the direction of the arrow II of FIG. 1.

As shown in the drawing, an egg 1 having a longitudinal axis 2 is positioned on two parallel rollers 3 mounted on axles 4. The axles of the parallel rollers 3 are arranged in a horizontal plane, whereby the longitudinal axis of the egg is also preferably arranged in a horizontal plane.

Drive wheels or sprockets 5 are connected with one end of each of the axles 4. The sprockets are interconnected by a chain 6 so that the axles are rotated together. More particularly, one of the axles has a second sprocket 7 mounted thereon which is connected with a drive motor 9 by a second drive chain 8. The drive motor is reversible and thus is operable to rotate the rollers in opposite directions via the drive chains 6,8 and the sprockets 5,7.

The rollers 3 are arranged in the cooking chamber of an egg cooking machine (not shown) so that the egg 1 is cooked while it is rotated about its longitudinal axis 2. The drive motor 9 is operated to rotate the egg in a first direction about its longitudinal axis for a first interval of time and in a second direction about its longitudinal axis opposite the first direction for a second interval of time. In a preferred embodiment, the first and second intervals of time are equal. The egg is rotated back and forth within the cooking chamber so that during cooking of the egg and solidification of the egg white, the egg yolk is centered radially to the longitudinal axis of the egg and is also moved along the axis until the yolk is spaced an adequate distance from the ends of the egg. Accordingly, after the egg has been cooked, the egg yolk is uniformly surrounded by a thick layer of egg white. When the egg is subsequently peeled, especially by a machine, the risk of damage to the layer of egg white and the risk that the egg yolk will fall out of the cooked and hardened egg are minimized.

Preferably, the egg is rotated relatively frequently in opposite directions and at a relatively high speed in order to obtain optimal centering of the yolk.

It is often the case that the total cooking time for an egg exceeds the period of time that is necessary to solidify the egg white. However, rotation of the egg beyond the time for hardening of the egg white is inconsequential and does no damage to the egg yolk or the egg white. What is important is that the egg be rotated at intervals and in the opposite direction until the egg white has solidified to guarantee centering of the yolk.

The inventive method leads to a highly effective and optimal centering of the egg yolk. Tests have demonstrated that centering of the yolk occurs not only radially to the longitudinal axis of the egg but also along the longitudinal axis in such a manner that the egg yolk is centered so that at both ends of the egg, a liberal enclosure of the yolk with egg white is obtained.

The consistent results obtained with the present method are due to the fact that by turning the egg in opposite directions, the liquid egg white continuously flows around the egg yolk. During the cooking process, the egg white initially hardens adjacent the egg shell and progresses inwardly. Thus the space available for the white to pass around the yolk grows increasingly smaller as the egg white hardens so that the yolk must automatically migrate in the direction of the longitudinal axis as well along the axis to a point (i.e. the center) where the layer of egg white surrounding the yolk is uniform on all sides thereof.

It has also been determined that in accordance with the invention, the formation of layers of egg white during solidification thereof, which often arises with brown-shelled eggs, is avoided.

Because of the consistent centering of the egg yolk with the method according to the invention, damage to the cooked egg during automated peeling (due to the improper envelopment of the yolk with hardened egg white) is avoided. Thus the failure rate during automated cooking and peeling of eggs is reduced to near zero.

While in accordance with the provisions of the patent statute the preferred forms and embodiments have been illustrated and described, it will be apparent to those of ordinary skill in the art that various changes and modifications may be made without deviating from the inventive concepts set forth above.

What is claimed is:

1. A method for centering an egg yolk during cooking, comprising the steps of
    (a) cooking the egg;
    (b) rotating the egg in a first direction about its longitudinal axis for a first interval of time during said cooking step;
    (c) rotating the egg in a second direction about its longitudinal axis opposite said first direction for a second interval of time during said cooking step; and
    (d) repeating steps (b) and (c) until the egg white has solidified.

2. A method as defined in claim 1, wherein the longitudinal axis of the egg is in a horizontal plane during rotation of the egg in the first and second directions.

3. A method as defined in claim 1, wherein said first and second intervals of time are relatively short with respect to the solidification time of the egg white.

4. A method as defined in claim 1, wherein said first and second intervals of time are the same.

5. A method as defined in claim 1, wherein the egg is rotated rapidly in said first and second directions.

* * * * *